United States Patent [19]
Takami et al.

[11] Patent Number: 6,141,960
[45] Date of Patent: Nov. 7, 2000

[54] EXHAUST GAS PURIFYING SYSTEM FOR ENGINE

[75] Inventors: Akihide Takami; Hideharu Iwakuni; Makoto Kyogoku; Hiroshi Yamada; Kenji Okamoto; Junichi Taga; Tomomi Watanabe; Hirofumi Nishimura; Tadataka Nakazumi; Youichi Kuji; Masayuki Kuroki, all of Hiroshima, Japan

[73] Assignee: Mazda Motor Corporation, Hiroshima, Japan

[21] Appl. No.: 09/129,755

[22] Filed: Aug. 5, 1998

[30] Foreign Application Priority Data

Aug. 6, 1997 [JP] Japan ................................... 9-211468
Jul. 24, 1998 [JP] Japan .................................. 10-209674

[51] Int. Cl.⁷ ....................................................... F01N 3/00
[52] U.S. Cl. ............................... 60/286; 60/285; 60/297; 123/431
[58] Field of Search ............................. 60/285, 286, 297, 60/295, 301; 123/430, 295, 431, 305

[56] References Cited

U.S. PATENT DOCUMENTS

| | | |
|---|---|---|
| 5,402,641 | 4/1995 | Katoh et al. ............................. 60/285 |
| 5,448,887 | 9/1995 | Takeshima ............................... 60/278 |
| 5,472,673 | 12/1995 | Goto et al. .............................. 60/285 |
| 5,607,650 | 3/1997 | Debbage et al. . |
| 5,735,119 | 4/1998 | Asanuma et al. ........................ 60/276 |
| 5,832,722 | 11/1998 | Cullen et al. ............................ 60/274 |

FOREIGN PATENT DOCUMENTS

| | | |
|---|---|---|
| 0 580 389 A1 | 1/1993 | European Pat. Off. . |
| 06272538 | 9/1994 | European Pat. Off. . |
| 06272541 | 9/1994 | European Pat. Off. . |
| 09032619 | 4/1997 | European Pat. Off. . |
| 0 903 481 A1 | 3/1999 | European Pat. Off. . |
| 6-272538 | 9/1994 | Japan . |
| 6-272541 | 9/1994 | Japan . |

Primary Examiner—Thomas Denion
Assistant Examiner—Binh Tran
Attorney, Agent, or Firm—Nixon Peabody LLP; Donald R. Studebaker

[57] ABSTRACT

An exhaust gas purifying system includes an exhaust gas purifying catalyst having a nitrogen oxide absorbing material which is installed in an exhaust line of an engine and performs split fuel injection to inject fuel directly into each combustion chamber partly during a suction stroke and partly during a compression stroke to provide and supply an increased amount of carbon monoxide to the nitrogen oxide absorbing material so as thereby to desorb sulfur oxides from the nitrogen oxide absorbing material.

16 Claims, 13 Drawing Sheets

EXHAUST GAS PURIFYING SYSTEM FOR ENGINE

BACKGROUND OF THE INVENTION

1. Field of the Invention

The invention relates to an exhaust gas purifying system for an internal combustion engine.

2. Description of the Related Art

It has widely been known in the art to use nitrogen oxide absorbing materials for controlling NOx emission level. Such a nitrogen oxide absorbing material, installed in an exhaust line, on one hand, absorbs nitrogen oxides (NOx) in an exhaust gas while an air-fuel ratio of the exhaust gas is higher and, on the other hand, releases the nitrogen oxides (NOx) while the concentration of oxygen ($O_2$) in the exhaust gas is lowered. The nitrogen oxides (NOx) released from the nitrogen oxide absorbing material are then reduced. In the case where such a nitrogen oxide absorbing material is installed as a catalyst in an exhaust system of a vehicle which is used in a specific countries or regions where a fuel and an engine oil ontain sulfur, the nitrogen oxide absorbing material has a property of easily absorbing sulfur oxides (SOx) rather than nitrogen oxides (NOx) in the exhaust gas. The nitrogen oxide absorbing material poisoned as a result of sulfur oxide absorption suffers a significant decline in efficiency of nitrogen oxide absorption.

Japanese Unexamined Patent Publication No. 6-272541 teaches that a nitrogen oxide absorbing material containing barium oxide is changed into barium sulfate ($BaSO_4$) due to poisoning by sulfur oxides (SOx) and that, when an air-fuel ratio of the exhaust gas is lowered after heating the nitrogen oxide absorbing material to a high temperature, the barium sulfate ($BaSO_4$) is decomposed and desorbed in the form of a gas of sulfur oxide ($SO_2$). Further, Japanese Unexamined Patent Publication No. 6-272538 teaches that, in order to decompose nitrogen oxides (NOx) absorbed in a nitrogen oxide absorbing material installed in an exhaust line of an engine, hydrocarbons (HC) are imperfectly burnt to produce carbon monoxide (CO) and the carbon monoxide (CO) is supplied to the nitrogen oxide absorbing material to reduce it.

However, in order to desorb a sulfur component in the form of a gas of sulfur oxide ($SO_2$) from the nitrogen oxide absorbing material only by heating the nitrogen oxide absorbing material, it is necessary to heat the nitrogen oxide absorbing material to approximately 800 to 900° C., which causes thermal deterioration of the nitrogen oxide absorbing material and is always undesirable. During heating, there occurs no decomposition of barium sulfate ($BaSO_4$) nor desorption of sulfur oxide ($SO_2$) until the nitrogen oxide absorbing material is heated to a high temperature even when an air-fuel ratio of exhaust gas is lowered. Further, supplying carbon monoxide (CO) to the nitrogen oxide absorbing material is made not for the sake of dissolving poisoning by sulfur oxides (SOx) but for the sake of reducing nitrogen oxides (NOx).

SUMMARY OF THE INVENTION

It is an objective of the invention to provide an exhaust gas purifying system equipped with a nitrogen oxide absorbing material which causes the nitrogen oxide absorbing material to desorb sulfur oxides (SOx) as a poisoning material therefrom even at low temperatures.

As a result of a study and experiments regarding poisoning of nitrogen oxide absorbing materials by sulfur oxides (SOx) which have been conducted by the inventors of this application, it was revealed that supplying a large amount of carbon monoxides (CO) to a nitrogen oxide absorbing material with barium (Ba) contained causes easy desorption of a sulfur component in the form of a gas of sulfur oxide ($SO_2$) from the nitrogen oxide absorbing material, based on which the exhaust gas purifying system of the invention was accomplished.

The exhaust gas purifying system of the invention includes a nitrogen oxide absorbing material installed in an exhaust line of an engine to absorb nitrogen oxides (NOx) in the exhaust gas and to reduce them while a fuel mixture is lean and has a higher (leaner) air-fuel ratio represented by an excess air factor ($\lambda$) is greater than 1 (one). During a specified engine operating condition under which emissions other than nitrogen oxides (NOx) are absorbed by the nitrogen oxide absorbing material, the exhaust gas purifying system supplies carbon monoxide (CO) to the nitrogen oxide absorbing material and has it absorbed by nitrogen oxide absorbing material so as to release the other emissions from the nitrogen oxide absorbing material. In this instance, while an air-fuel ratio of the exhaust gas is higher (richer), NOx emissions in the exhaust gas are absorbed by the nitrogen oxide absorbing material and prevented from being discharged into the atmosphere. The nitrogen oxides (NOx) are released from the nitrogen oxide absorbing material when the air-fuel ratio of the exhaust gas becomes lower (leaner) and reduced. When the nitrogen oxide absorbing material is poisoned by the other emissions, carbon monoxide (CO) is supplied to the nitrogen oxide absorbing material to place it in an atmosphere of carbon monoxide (CO), so that exhaust components which are harder to be absorbed by the nitrogen oxide absorbing material than the carbon monoxide (CO) are made relatively easily releasable from the nitrogen oxide absorbing material even at relatively lower temperatures and the carbon monoxide (CO) is absorbed by the nitrogen oxide absorbing material, consequently. As a result, the nitrogen oxide absorbing material is prevented from being poisoned.

In the case where a problem of poisoning of the nitrogen oxide absorbing material by sulfur oxides (SOx) is encountered, while the nitrogen oxide absorbing material has a property of absorbing sulfur oxides (SOx) and carbon oxides (COx) (the order of relative difficulty of absorption being first nitrogen oxides (NOx), then sulfur oxides (SOx) and finally carbon oxides (COx) and experiences a drop in nitrogen oxides (NOx) absorption due to poisoning by sulfur oxides (SOx), however, it becomes easy to desorb sulfur oxides (SOx) at relatively low concentration and, as a result of which, it restores its NOx absorption ability. There is a material containing alkaline earth metals and alkaline metals as a nitrogen oxide absorbing material of this kind. This type of nitrogen oxide absorbing material takes a form of nitrate when absorbing nitrogen oxides (NOx), a form of sulfate when absorbing sulfur oxides (SOx) and a form of carbonate when absorbing carbon monoxide (CO). Rear-earth metals such as lanthanum (La) can be available as a nitrogen oxide absorbing material. An especially useful nitrogen oxide absorbing material is one which containing barium (Ba). When a nitrogen oxide absorbing material contains barium (Ba) and platinum (Pt) and the barium (Ba) takes a form of carbonate in an atmosphere of exhaust gas which has a high (lean) air-fuel ratio (for example the air-fuel ratio of exhaust gas is higher than 22 and the oxygen ($O_2$) concentration of exhaust gas is greater than 5%), nitrogen oxides (NOx) are oxidized on platinum (Pt) and activated thereby, and absorbed as expressed by the following reaction formula:

$$BaCO_3 + NO_2 + O_2 \rightarrow (BaNO_3)_2 + CO_2 \uparrow \text{(coefficients are omitted)}$$

Further, sulfur oxides (SOx) are oxidized and activated, and absorbed as expressed by the following reaction formula:

$$BaCO_3+SO_2+O_2 \rightarrow BaSO_4+CO_2\uparrow \text{(coefficients are omitted)}$$

The nitrogen oxide absorbing material with nitrogen oxides (NOx) and sulfur oxides (SOx) absorbed therein desorbs partly the nitrogen oxides (NOx) and sulfur oxides (SOx) when an atmosphere of exhaust gas which has a low air-fuel ratio or an excess air factor ($\lambda$) smaller than 1 (one) (the oxygen ($O_2$) concentration of exhaust gas is lower than 5% or 0%). However, under presence of carbon monoxide (CO), it releases the nitrogen oxides (NOx) and sulfur oxides (SOx) so as to be reactivated due to reaction expressed by the following formula:

$$Ba(NO_3)_2+CO \rightarrow BaCO_3+NO_2\uparrow \text{(coefficients are omitted)}$$

$$BaSO_4+CO \rightarrow BaCO_3+SO_2\uparrow \text{(coefficients are omitted)}$$

Sulfur oxides (SOx) are desorbed as hydrogen sulfide ($H_2S$) if weakly bonding with the nitrogen oxide absorbing material and, however, have a tendency to be desorbed as carbonyl sulfide (COS) at a temperature higher than 450° C., in particular higher than 500° C., when carbon monoxide (CO) acts on if strongly bonding with the nitrogen oxide absorbing material. Although the nitrogen oxide absorbing material poisoned by sulfur oxides (SOx) is hard to desorb them, it becomes easily apt to desorb sulfur oxides (SOx) even at a temperature lower than 600° C. under presence of carbon monoxide (CO) due to progress of the above chemical reactions.

The amount of carbon monoxide (CO) is increased by producing a stoichiometric or more enriched fuel mixture near a spark plug as well as a lean fuel mixture around the rich fuel mixture and burning them. The enriched fuel mixture near a spark plug burns with a high burning velocity immediately after ignition and is, however, apt to produce hydrocarbons (HC) due to a limited amount of oxygen ($O_2$). While the combustion spreads out to the lean fuel mixture, combustion of the lean fuel mixture is slow with an effect of easily producing carbon monoxide (CO) which is the same result as attained by retarding an ignition timing as well as an effect of rising a exhaust gas temperature. In other words, there is no necessity to advance an ignition timing, so that the amount of carbon monoxide (CO) is increased due to an effect of an ignition timing retardation. The rise in exhaust gas temperature effects on the nitrogen oxide absorbing material to desorb poisoning components. This effect is not limited to the case where a stoichiometric or more enriched fuel mixture is produced near a spark plug. That is, an increase in the amount of carbon monoxide (CO) is provided by producing a stoichiometric or more enriched fuel mixture locally in a combustion chamber as well as a lean fuel mixture in the remaining part of the combustion chamber and burning them. In the part of the combustion chamber where the enriched fuel mixture is charged, oxygen ($O_2$) is sparse in the part, so that it is easy to produce carbon monoxide (CO). On the other hand, in the remaining part of the combustion chamber where the lean fuel mixture is charged, combustion is slow, so as to provide the same effect as attained by retarding an ignition timing. As a result, carbon monoxide (CO) is easily produced and a rise in exhaust gas temperature is yielded.

In order to charge and burn rich and lean fuel mixtures in the combustion chamber, it is suitable to split fuel injection of a required amount of fuel into two or more. For example, while, for charging a rich fuel mixture near a spark plug, it is preferable to perform fuel direct injection through a fuel injector, the fuel direct injection is not always necessary to charge a lean fuel mixture around the rich fuel mixture and it may be done to spray fuel into the combustion chamber through an intake port. Preferably, a given amount of fuel is split into a plurality of parts and directly sprayed into the combustion chamber over suction and compression strokes during one combustion cycle for each cylinder. In this instance, a charge of rich fuel mixture is developed locally in the combustion chamber by fuel injection made at a later stage and a charge of lean fuel mixture is developed by fuel injection made at an early stage in a part of the combustion chamber where fuel provided by the fuel injection made at the later stage reaches. There have been known some types of split fuel injection, namely a type splitting fuel injection into two one of which is made in a suction stroke and another of which is made in a compression stroke, a type in which fuel is split into a plurality of parts and injected in a suction stroke only, and a type in which fuel is split into a plurality of parts and injected in a compression stroke only. For the splitting fuel injection, a fuel injector must be frequently opened and closed for each combustion cycle, which increases a proportion of coarse fuel particles at the beginning of opening of the fuel injector, so as to cause aggravation of vaporization of fuel. As a result, even when a fuel mixture is uniformly distributed over the interior of the combustion chamber, carbon monoxide (CO) is easily produced due to imperfect combustion occurring locally in the combustion chamber. Further, a time allowed is considerably short before fuel ignition in the compression stroke, the fuel is fired in a state of considerably aggravated vaporization of fuel with an effect of rising a carbon monoxide emission level. In view of fuel economy when split fuel injection is made, it is desirable to control a fuel mixture with an air-fuel ratio represented by an excess air factor ($\lambda$) of 1 (one) in the whole combustion chamber. Fuel direct injection is preferred to control an air-fuel ratio of a fuel mixture in the combustion chamber as well as to desorb poisoning components from the nitrogen oxide absorbing material.

The term "specified" engine operating condition used herein shall mean and refer that carbon monoxide (CO) is not regularly supplied, in other words the state where it is judged that there occurs an increase in the amount of sulfur oxides (SOx) absorbed in the nitrogen oxide absorbing material. For example, in the state where, while the engine is under ordinary operating states in lower and middle zones of engine speeds and loading, an air-fuel ratio represented by an excess air factor ($\lambda$) is higher than 1 (one), when regarding an engine operating zone in which there occurs a rise in exhaust gas temperature due to a rise in either one of engine speeds and loading as a $\lambda$–1 zone, it is suitable to supply carbon oxide (CO) by the split fuel injection in the $\lambda$–1 engine operating zone. When engine operation enters an accelerating state from an ordinary operating state or stays in an ordinary operating state for a period longer than a specified period, it may be suitable to supply carbon oxide (CO) by the split fuel injection with an air-fuel ratio represented by an excess air factor ($\lambda$) of 1 (one). Further, carbon oxide (CO) may be supplied when the engine enters the $\lambda$–1 engine operating zone after a specified period of duration of an ordinary operating state.

As was previously described, supplying carbon oxide (CO) to the nitrogen oxide absorbing material makes it easy to desorb sulfur oxides (SOx). While hydrocarbon (HC) works as a reducing component as well as carbon monoxide (CO), its desorption effect is weak. However, under presence of zeolite, hydrocarbon (HC) is partly oxidized due to an catalytic effect of the zeolite to change to hydrocarbonate (HCO) and carbon monoxide (CO) which are effectively contributory to desorption of sulfur oxides (SOx). In view of the above, it is preferable to provide a layer of zeolite disposed over a layer of nitrogen oxide absorbing material so as to come into contact with exhaust gases prior to the nitrogen oxide absorbing material. Exhaust gases come into contact with the zeolite through which hydrocarbons (HC) in the exhaust gases are changed to hydrocarbonate (HCO) and carbon monoxide (CO) before contact with the nitrogen oxide absorbing material. When disposing the nitrogen oxide absorbing material layer on the upstream side of the nitrogen oxide absorbing material in the exhaust line, the same effect as described above is also realized.

A layer of ceria may be disposed over a nitrogen oxide absorbing material layer so as to come into contact with exhaust gases prior to the nitrogen oxide absorbing material, which is desirable to accelerate desorption of sulfur oxides (SOx). Exhaust gases come into contact with the ceria before contact with the nitrogen oxide absorbing material. When disposing the ceria layer on the upstream side of the nitrogen oxide absorbing material in the exhaust line, the same effect as described above is also realized.

In order to reduce nitrogen oxides (NOx) desorbed from the nitrogen oxide absorbing material, a nitrogen oxide purifying catalyst is disposed downstream from a nitrogen oxide absorbing device in the exhaust line, or otherwise, a nitrogen oxide absorbing material may be mixed with nitrogen oxide purifying catalytic metals. Mixing these materials can be done in various manners. For example, an oxide absorbing layer of a nitrogen oxide absorbing material and a noble metal or noble metals is coated on a support member which is disposed in an exhaust line. The noble metal catalyst reduces nitrogen oxides (NOx) desorbed from the nitrogen oxide absorbing material. It is preferable to provide a nitrogen oxide absorbing material layer with barium (Ba), ceria and Platinum (Pt), which absorb nitrogen oxides (NOx), contained therein and a catalyst layer containing noble metals and zeolite over the nitrogen oxide absorbing material layer. Barium (Ba) does an excellent job of absorbing nitrogen oxides (NOx), and platinum (Pt) makes the nitrogen oxide absorbing material apt to desorb nitrogen oxides (NOx) as well as absorbing oxygen ($O_2$). As a result, there is provided an atmosphere microscopically suitable for reduction purification of nitrogen oxides (NOx). Platinum (Pt) is one having high reduction resolution among noble metals and, when combined with rhodium (Rh), yields an increase in nitrogen oxide conversion efficiency. Although palladium (Pd) and iridium (Ir) are available as a noble metal, platinum (Pt) and rhodium (Rh) are more suitable. Noble metals in the catalyst layer reduces nitrogen oxides (NOx) desorbed from the nitrogen oxide absorbing material layer. As described above, while the zeolite changes hydrocarbons (HC) to hydrocarbonate (HCO) and carbon monoxide (CO) with which desorption of sulfur oxides (SOx) is accelerated, it makes the catalyst layer reduce nitrogen oxides (NOx) in an atmosphere of exhaust gas with a lean air-fuel ratio. Accordingly, in this instance, nitrogen oxides (NOx) in the exhaust gas is partly reduced by the catalyst of the over layer and partly absorbed by the nitrogen oxide absorbing material of the under layer. The later nitrogen oxides (NOx) is reduced by the catalyst of the over layer when released as a result of an enriched air-fuel ratio.

The nitrogen oxide absorbing material layer may contain cerium-zirconium (Ce-Zr) composite oxides in place of ceria with an effect of improvement of heat resistance and resistance to poisoning by sulfur (S). While each of cerium-zirconium (Ce-Zr) composite oxides and ceria is able to absorb oxygen ($O_2$), the cerium-zirconium (Ce-Zr) composite oxides have higher resistance to sintering than the ceria when their particles exposed to intense heat. When ceria is sintered with intense heat, it buries platinum (Pt) as a noble metal and barium (Ba) as a nitrogen oxide absorbing material therein, so as to encounter chemical deterioration. However, because of the high resistance to sintering, cerium-zirconium (Ce-Zr) composite oxide is hard to cause chemical deterioration. Further, because of high ability to absorb oxygen ($O_2$), while cerium-zirconium (Ce-Zr) composite oxide produces an atmosphere in which nitrogen oxides (NOx) are easily reduced due to a drop in oxygen concentration microscopically around noble metals, it traps oxygen ($O_2$) of nitrogen oxides (NOx) to activate them for easy reduction.

The nitrogen oxide absorbing material layer has higher ability to oxidize nitrogen monoxide (HC) when containing cerium-zirconium (Ce-Zr) composite oxides than when containing ceria and, however, cause a drop in ability to oxidize sulfur dioxide ($SO_2$). As a result, the nitrogen oxide absorbing material layer containing cerium-zirconium (Ce-Zr) composite oxides absorbs an increased amount of nitrogen oxides and, however, a decreased amount of sulfur oxides. In particular, the nitrogen oxide absorbing material layer containing a cerium-zirconium (Ce-Zr) composite oxide is improved in resistance to poisoning by sulfur (S) more when having a large proportion of zirconium oxide ($ZrO_2$) than when having a large proportion of cerium oxide ($CeO_2$).

The utilization of cerium-praseodymium (Ce-Pr) composite oxide provides improvement of heat resistance more enhanced as compared with the utilization of ceria. This is thought to be a result of a small drop in oxygen absorption ability of the cerium-praseodymium (Ce-Pr) composite oxide after exposure to heat.

As apparent from the above, the engine exhaust purifying system of the invention causes the nitrogen oxide absorbing material to desorb sulfur oxides (SOx) even at relatively lower temperatures. In particular, in combination with supply of carbon monoxide (CO) by means of split fuel injection, the carbon monoxide content of exhaust gas is increased by fuel injection control to prevent poisoning of the nitrogen oxide absorbing material by sulfur oxides (SOx) without installing extra mean for producing carbon monoxide in the exhaust line.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Figure 1:
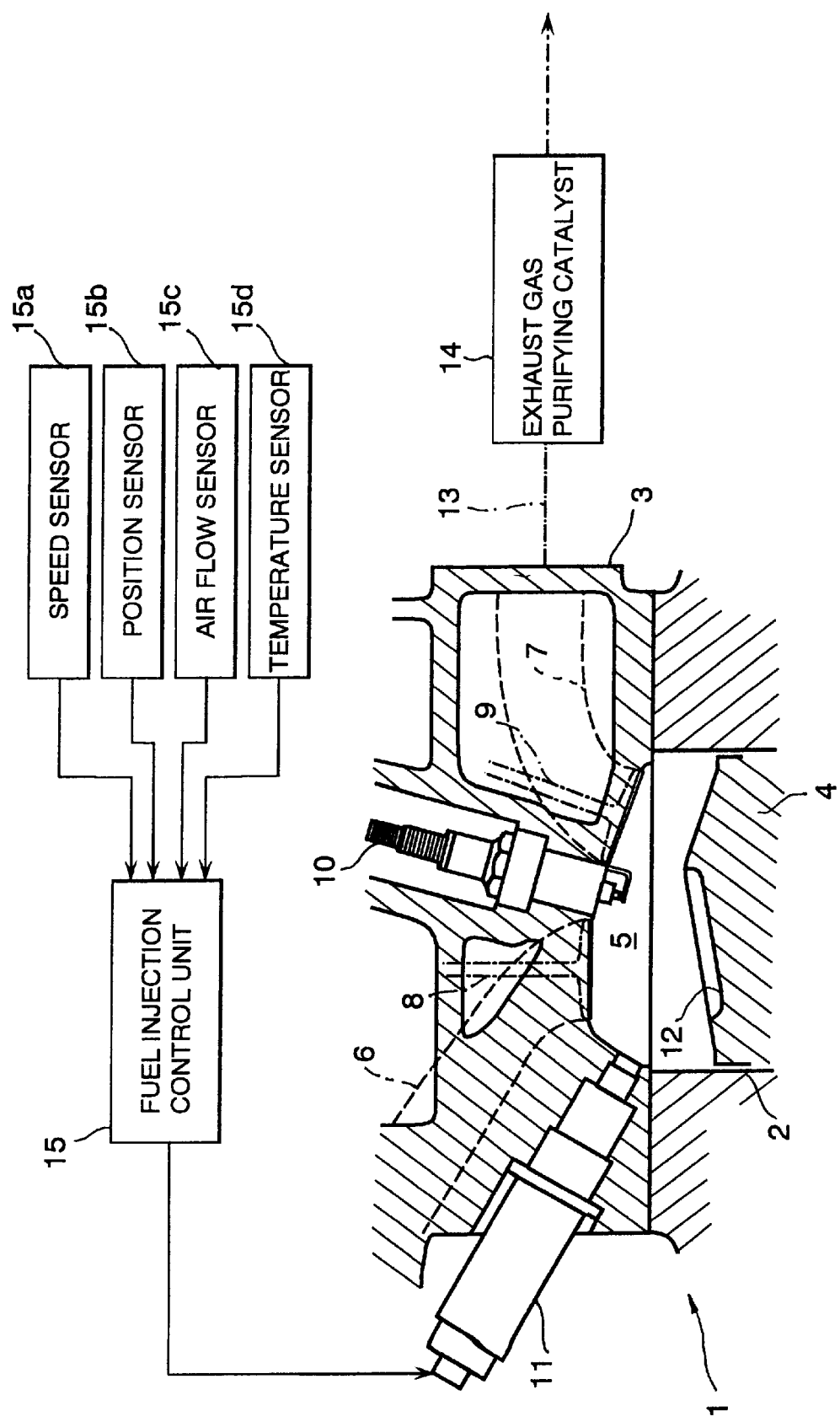
FIG. 1 is a schematic illustration showing an engine equipped with an exhaust gas purifying system according to an embodiment of the invention.

Referring to the drawings in detail and, in particular, to FIG. 1 showing a fuel direct injection, internal combustion engine 1 equipped with an exhaust gas purifying system in accordance with an embodiment of the invention, the internal combustion engine 1 consists of a cylinder block 2 and a cylinder head 3. The cylinder block 2 is provided with cylinder bores 2a (only one is shown) in which pistons 4 can slide. Combustion chambers 5 are formed by the tops of the pistons 4, a lower wall of the cylinder head 3 and the cylinder bores 2a. An intake port 6 and an exhaust port 7 open into each combustion chamber 5, and opened and shut at a predetermined timing by an intake valve 8 and an exhaust valve 9, respectively. A spark plug 10 is installed to the cylinder head 3 with its electrode tip placed down in the central section of the combustion chamber 5. A fuel injector 11 is installed to the cylinder head 3 such that it injects and directs fuel toward downward below the spark plug 10 in the combustion chamber 5 from the side. The piston 4 at the top is formed with a cavity 12 by which fuel from the fuel injector 11 is bounced toward the spark plug 10. An exhaust gas purifying catalyst 14 is installed in an exhaust line 13 extending from the exhaust port 7. An engine control unit 15 schematically shown in block, which is comprised of a programmed microprocessor, receives various signals from sensors including at least an engine speed sensor 15a, an accelerator position sensor 15b, an air flow sensor 15c and an engine cooling water temperature sensor 15d, all of which may be of any known types. On the basis of signals from the sensors 15a through 15d, the engine control unit 15 performs various engine control including fuel injection control in which the fuel injector 11 is controlled to inject fuel in a split fuel injection mode in a specified combustion zone with respect to engine operating conditions so that a high hydrocarbon content of exhaust gas is generated and directed to the exhaust gas purifying device 14, as will be described later.

Figure 2:
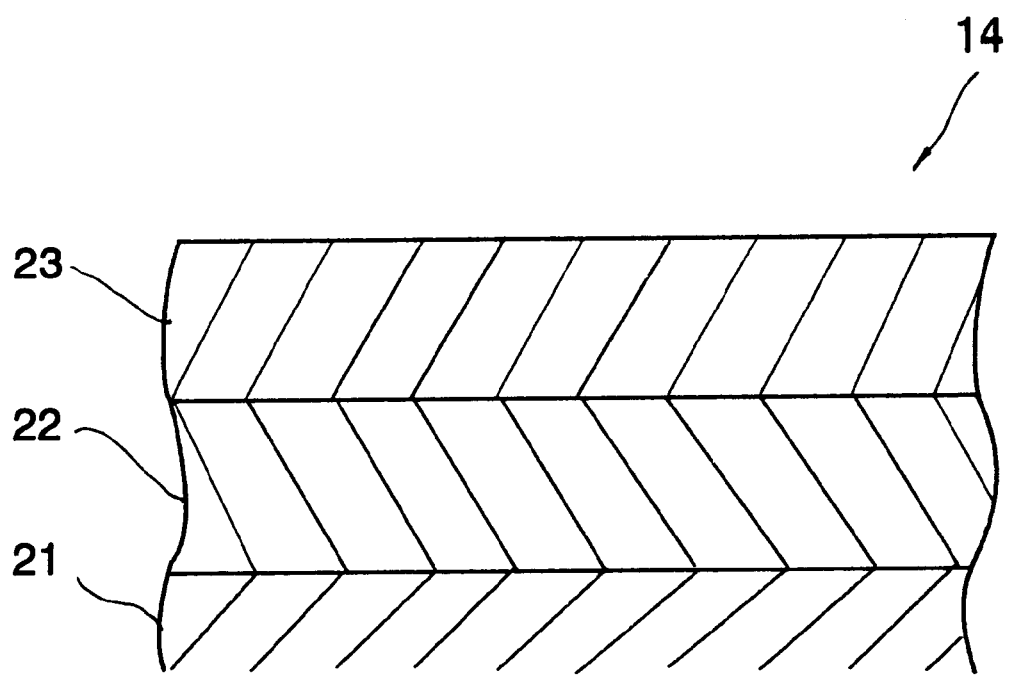
FIG. 2 is a cross-sectional view of a two layer exhaust gas purifying catalyst employed in the exhaust gas purifying system shown in FIG. 1.

FIG. 2 shows a catalyst 14 installed in the exhaust gas purifying device 14. The catalyst 14 uses a support member 21 such as a cordierite honeycomb bed coated with an under layer of a nitrogen oxide absorbing material (which is referred to as an NOx absorbing layer) and an over layer 23 of a catalytic material. The NOx absorbing layer 22 contains a main component consisting of platinum (Pt) and barium (Ba), as a nitrogen absorbing material, carried by active alumina particles as a carrier of which particles have large specific surface areas. The catalyst layer 23 contains a main component consisting of platinum (Pt) and rhodium (Rh) carried by zeolite as a carrier. In this instance, the exhaust gas purifying device 14 may have a layer of ceria coated over the catalyst layer 23.

The engine control unit 15 performs fuel injection control as a part of the engine control to determine current engine operating states, a fuel injection timing and a injector pulse width which is a measurement of how long the fuel injector 11 is kept open. Engine operating states include judgements of engine start, cold engine operation, warm-up engine operation, combustion zones and engine acceleration. These cold engine operation and warm-up engine operation are judged on the basis of an engine cooling temperature. The engine operating conditions regarding combustion zones are judged on the basis of an engine speed and an amount of intake air. The engine acceleration is judged based on an accelerator position. The engine control unit 15 bears various maps in the form of look-up table which are used to judge engine operating states. As a result of these judgements, a fuel injection timing and an injector pulse width are determined following a flow chart logic shown in FIGS. 3 through 5.

Figure 3:
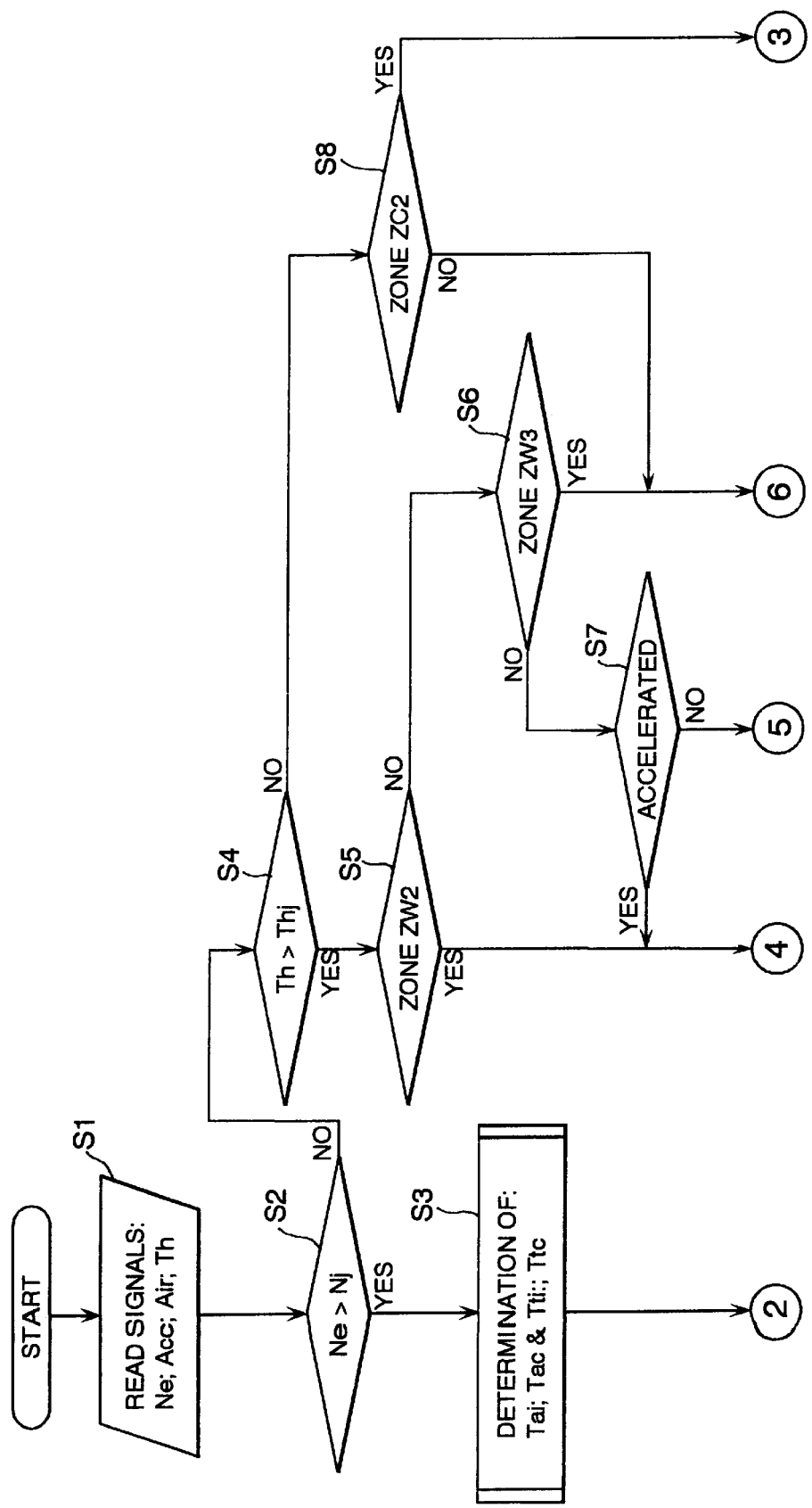
FIGS. 3 through 5 are a flow chart illustrating a sequence routine of fuel injection control.
Figure 4:
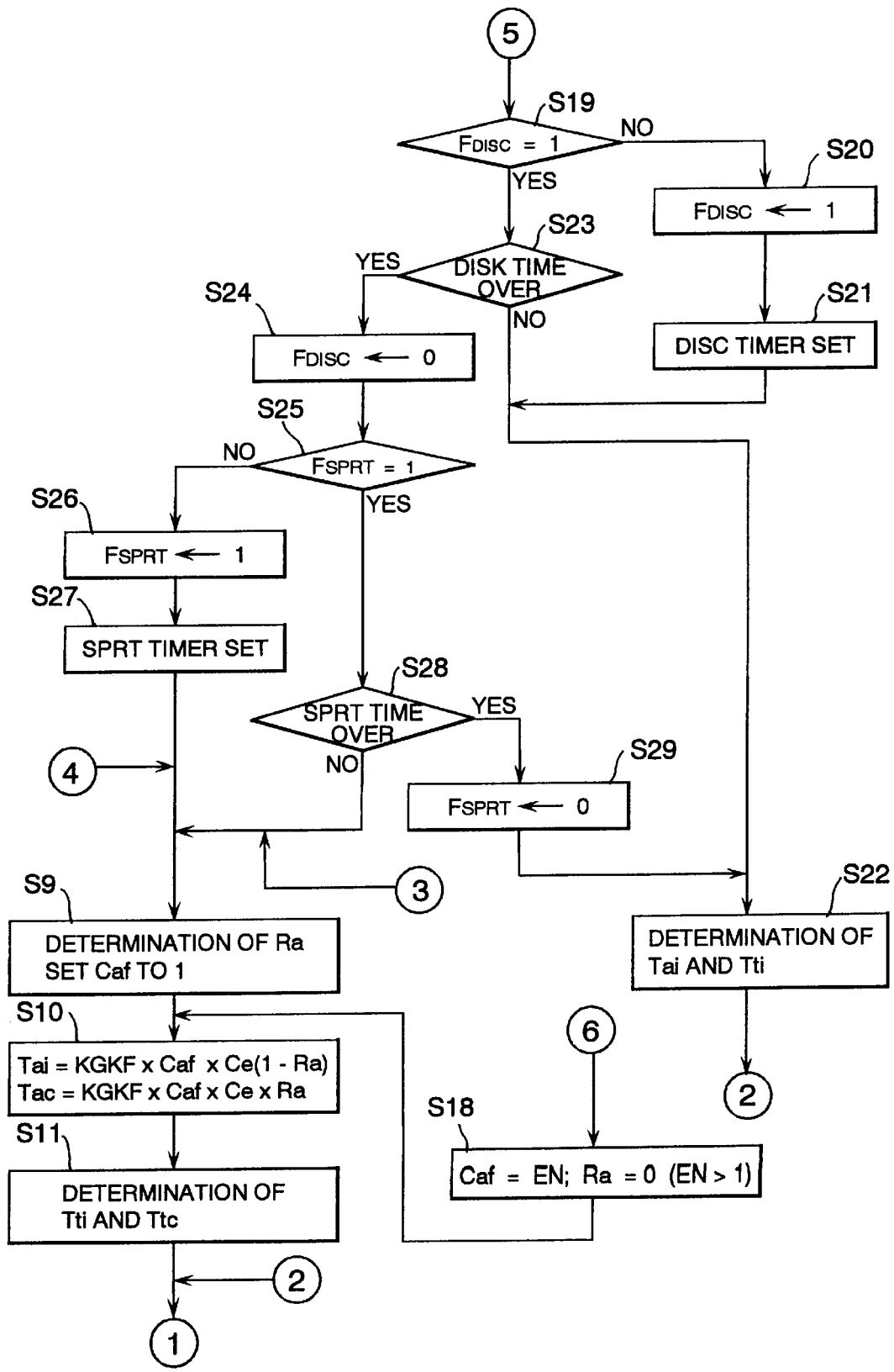
Figure 5:
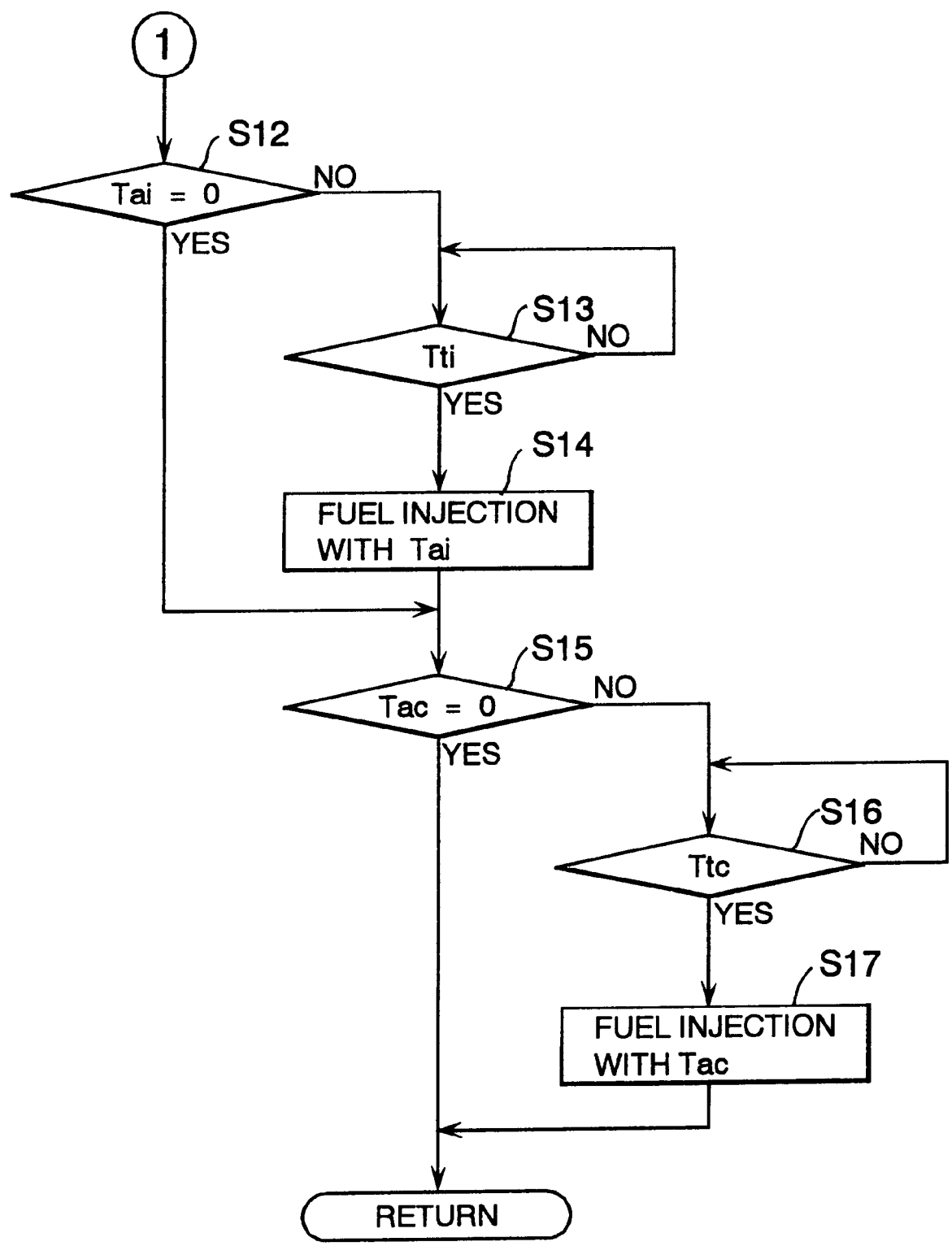

FIGS. 3 through 5 is a flow chart illustrating the fuel injection control sequence routine through which a fuel injection timing and an injector pulse width are determined. When the flow chart logic commences and control proceeds directly to a function block at step S1 where various signals from the sensors 15a–15c are read in to determine an engine speed Ne represented by a signal from the engine speed sensor 15a, an accelerator position Acc represented by a signal from the throttle position sensor 15b, an amount of intake air Air represented by an air flow rate represented by a signal from the air flow sensor 15c and an engine cooling water temperature Th represented by a signal from the water temperature sensor 15d. When the engine speed Ne is higher than zero (0) but lower than a specified speed Nj as a result of a judgement made at step S2, this indicates that the engine 1 is immediately after an engine start, then, a starting injector pulse width, i.e. a suction stage injector pulse width Tai, and a fuel injection timing Tti for fuel injection performed in a suction stroke (which is hereafter referred to as a suction stage fuel injection) are determined at step S3. In this instance, compression stage fuel injection which refers fuel injection performed in a compression stroke is not caused and, accordingly, an injector pulse width Tac for the compression stage fuel injection is set to 0 (zero). When the engine speed is higher than the specified speed Nj, this indicates that the engine 1 is operates for a while after the engine start, then, a judgement is made at step S4 as to whether the engine cooling water temperature Th is higher than a specified temperature Thj for warm-up engine operation. When the engine 1 has warmed up, that is the cooling water temperature Th is higher than the specified temperature Thj, a judgement is further made as to whether the engine 1 operates in a warm-up λ=1 charge combustion zone ZW2 at step S5 or in a warm-up enriched charge combustion zone ZW3 at step S6. These judgements are made on the basis of the engine cooling water temperature and an engine load Ce represented by an air charging efficiency determined based on the amount of intake air Air.

Figure 6:
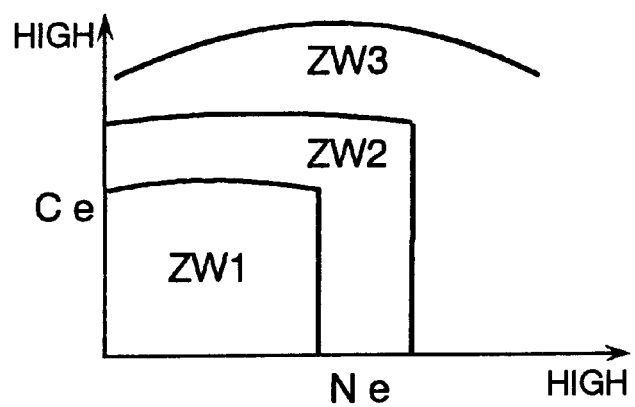
FIG. 6 is a diagrammatic illustration showing a map of combustion zones for worm-up engine operation.
Figure 7:
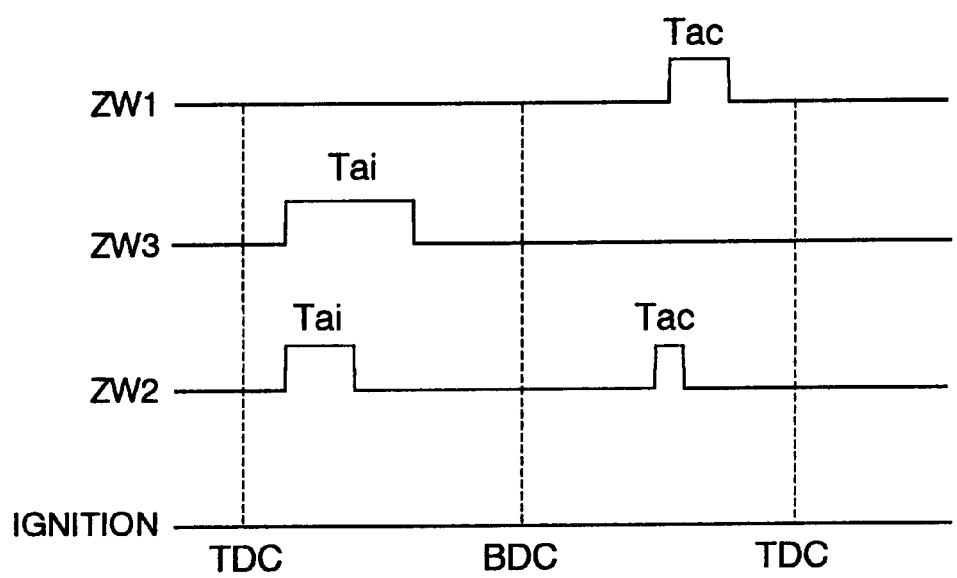
FIG. 7 is of fuel injection timing.
Figure 8:
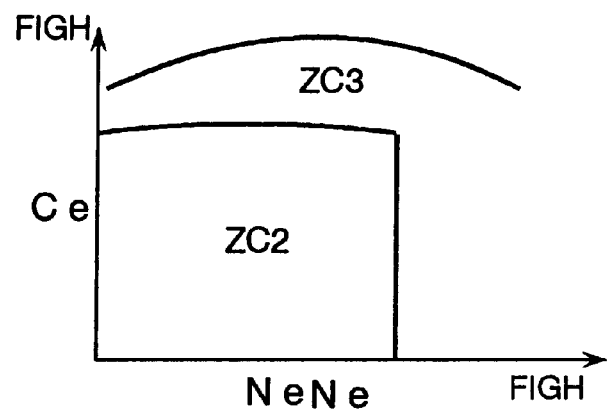
FIG. 8 is a diagrammatic illustration showing a map of combustion zones for cold engine operation.

As shown in FIG. 6, a warm-up engine operation control map for warm-up engine operation specifies three warm-up combustion zones, namely a warm-up stratified charge combustion zone ZW1 for lower and moderate engine speeds less than, for example, 3000 rpm and loading smaller than, for example, a half of full loading, a warm-up $\lambda=1$ charge combustion zone ZW2 for medium higher engine speeds and loading and a warm-up enriched charge combustion zone Z3 for higher engine speeds and loading. In the warm-up stratified charge combustion zone ZW1, fuel injection is made in a compression stroke only to distribute and stratify a fuel mixture unevenly around the spark plug 10 as shown in FIG. 7. In the warm-up $\lambda=1$ charge combustion zone ZW2, fuel injection is made both in an early stage of a suction stroke and in a middle or a later stage of a compression stroke to distribute a fuel mixture with an excess air factor ($\lambda$) of 1 as shown in FIG. 7. In the warm-up enriched charge combustion zone ZW3, fuel injection is made during an early to middle stage of a suction stroke to distribute an enriched fuel mixture. When the answer to the decision concerning the warm-up enriched charge combustion zone ZW3 made at step S6 is negative, this indicates that the engine 1 operates in the warm-up stratified charge combustion zone ZW1. Even while the engine 1 operates in the warm-up stratified charge combustion zone ZW1, when it is judged that the engine 1 is accelerated at step S7, fuel injection is performed in a split fuel injection mode as well as in the warm-up $\lambda=1$ charge combustion zone ZW2. It is determined that the engine 1 is accelerated based on the fact that there is an increase in engine speed, engine loading or throttle position. Further, even while it is judged that the engine 1 is under cold operation at step S4, when it is determined that the engine 1 operates in the warm-up $\lambda=1$ charge combustion zone ZW2 at step S8, fuel injection is divided into two stages, that is, the suction stage fuel injection and the compression stage fuel injection. As shown in FIG. 8, a cold engine operation control map for cold engine operation specifies two cold combustion zones, namely a cold $\lambda=1$ charge combustion zone ZC2 for lower and moderate engine speeds and loading and a cold enriched charge combustion zone ZC3 for higher engine speeds and loading. When the engine 1 operates in the cold $\lambda=1$ charge combustion zone ZC2, a pulse width correction factor Caf determined based on an air-fuel ratio, specifically an excess air factor $\lambda$ in this embodiment, and a splitting ratio Ra ($0 \leq Ra \leq 1$) are determined at step S9 as shown in FIG. 4. In this instance, the splitting ratio Ra refers a ratio of an amount of compression stage fuel injection relative to an entire amount of fuel injection during a single combustion cycle. In the cold $\lambda=1$ charge combustion zone ZC2, the pulse width correction factor Caf is set to 1 (one). The splitting ratio is specified according to amounts of fuel injection in a fuel injection control map. Subsequently, at step S10, injector pulse widths Tai and Tac for the suction stage fuel injection and the compression stage fuel injection are determined by calculating the following expressions:

$$Tai = KGKF \times Caf \times Cex \times (1-Ra)$$

$$Tac = KGKF \times Caf \times Cex \times Ra$$

where KGKF is a pulse width factor determined based on an amount of fuel injection;

Ra is a factor determined based on an air-fuel ratio. These factors KGKF and Ra have been experimentally determined with respect to amounts of fuel injection and air-fuel ratios, respectively, and stored in the form of map. In this instance, the pulse width correction factor Caf takes 1 (one) for an excess air factor $\lambda$ of 1 (one), this means that no correction is made for an injector pulse width when the excess air factor $\lambda$ is 1 (one). In this instance, the pulse width correction factor Caf is less than 1 (one) when the excess air factor $\lambda$ is greater than 1 (one) and is greater than 1 (one) when the excess air factor $\lambda$ is less than 1 (one). Subsequently, at step S11, fuel injection timings Tti and Ttc are determined for the suction stage fuel injection with the injector pulse width Tai and the compression stage fuel injection with the injector pulse width Tac as shown in FIG. 7.

As shown in FIG. 5, after the determination of the fuel injection timings at step S11, a judgement is made at step S12 as to whether the injector pulse width Tai for the suction stage fuel injection is 0 (zero). In the cold $\lambda=1$ charge combustion zone ZC2, the injector pulse width Tai has a certain measurement to perform the suction stage fuel injection. As soon as the injection timing Tti for the suction stage fuel injection has come at step S13, the engine control unit 15 provides a drive pulse having the injector pulse width Tai to drive the fuel injector 11 to splay fuel in a suction stroke at step S14. In the same manner, in the cold $\lambda=1$ charge combustion zone ZC2, as soon as the injection timing Ttc for the compression stage fuel injection has come, the engine control unit 15 provides a drive pulse having the injector pulse width Tac to drive the fuel injector 11 to splay fuel in a compression stroke through steps S15 to S17.

The affirmative answer to the judgement made at step S6 or the negative answer to the judgement made at step S8 indicates that the engine 1 operates in the enriched charge combustion zone ZW3 or ZC3. In any enriched charge combustion zone ZW3 or ZC3, after setting the pulse width correction factor Caf and the splitting ratio Ra to EN and 0 (zero), respectively, at step S18 (see FIG. 4), injector pulse widths Tai and Tac for the suction stage fuel injection and the compression stage fuel injection are determined at step S10 and, subsequently, fuel injection timings Tti and Ttc are determined for the suction stage fuel injection with the injector pulse width Tai and the compression stage fuel injection with the injector pulse width Tac at step S11. In these enriched charge combustion zones ZW3 and ZC3 where only the suction stage fuel injection is performed, while the pulse width correction factor Caf is greater than 1 (one), the splitting ratio Ra is 0 (zero).

Figure 9:
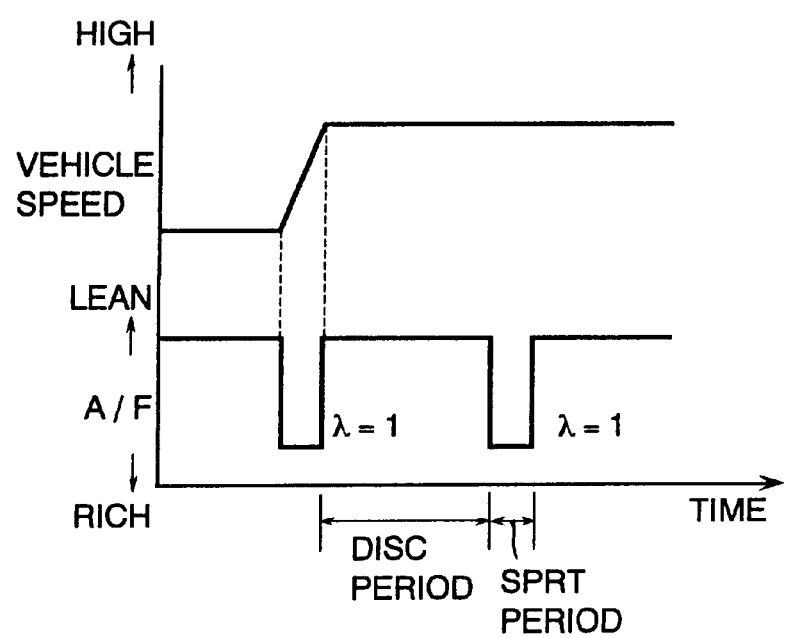
FIG. 9 is a time chart of $\lambda$–1 split fuel injection for ordinary engine operation.

When the answer to the decision concerning acceleration made at step S7 is negative, this indicates that the engine 1 operates under ordinary conditions in the warm-up stratified charge combustion zone ZW1, then, only when a specified period of time (which is referred to a DISC time period) has passed from a transition to an ordinary operating condition from an accelerating condition, fuel injection is performed in the split fuel injection mode for a specified period of time (which is referred to as a SPRT time period shown in FIG. 9.) Specifically, when a transition flag FDISC remains down or is not yet set up to a state of "1" which indicates that the engine 1 has not yet entered an ordinary operating condition at step S19, then, after setting the transition flag FDISC to the state of "1" at step S20 and a DISC timer to the DISC time at step S21, an injector pulse width Tai and a fuel injection timing Tti for the suction stage fuel injection are determined at step S22 to perform the suction stage fuel injection through steps S12 to S17. On the other hand, when the transition flag FDISC has been up, this indicates that the engine 1 has been under an ordinary operating condition, then, a judgement is made at step S23 as to whether the DISC timer has counted up the DISC time. When the DISC time has not yet been over, the suction stage fuel injection is continued. However, when the DISC time has been over, after resetting the transition flag FDISC down at step S24, it enters the SPIJ time period for the split fuel injection, which is indicated by a split injection flag FSPRT set to a state of "1." When the split injection flag FSPRT is down at step S25, after setting the split injection flag FSPRT up at step S26 and a SPRT timer to the SPRT time at step S27, the split fuel injection is performed through steps S9 to S17. On the other hand, when the split injection flag FSPRT is up at step S25, it is judged at step S28 as to whether the SPRT time period has been over. Until the SPRT time period SPRT becomes over, the split fuel injection is continued through steps S9 to S17. When the SPRT time period SPRT becomes over, after resetting the split injection flag FSPRT down at step S29, only the suction stage fuel injection is performed through steps S12 to S17 via step S22.

By this way, in the case where, while the engine 1 operates in the λ=1 charge combustion zone ZW2 or ZC2, accelerating engine operation or warm-up ordinary engine operation continues, the split fuel injection is temporarily conducted for the specified period of time, as a result of which, a carbon monoxide (CO) emission increases with an effect of increasing the temperature of exhaust gas and is trapped by the NOx absorbing layer 22 of the catalyst 14. The carbon monoxide (CO) accelerates desorption of sulfur oxides (SOx) from the NOx absorbing layer 22, re-activating the NOx absorbing layer 22. In particular, while the engine 1 is in an operating zone of middle engine speeds less than, for example, 3000 rpm and middle loading smaller than, for example, a half of full loading where the exhaust gas is at a high temperature, or after the engine 1 has shifted to the operating zone, the split fuel injection may be performed with an effect of preventing the nitrogen oxide absorbing material being poisoned by sulfur oxides (SOx).

Figure 10:
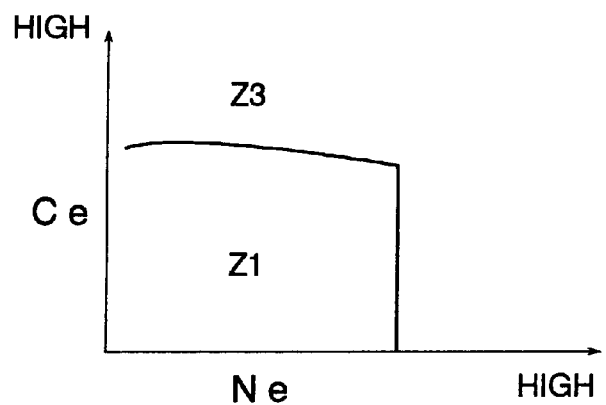
FIG. 10 is a diagrammatic illustration showing a map in which no λ-1 combustion zone is specified.
Figure 11:
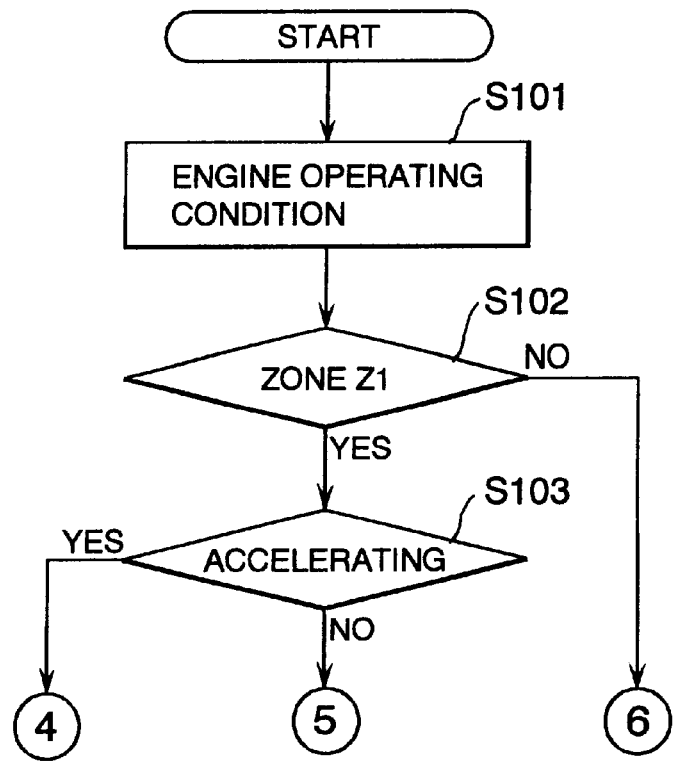
FIG. 11 is a flow chart illustrating a sequence routine of fuel injection control for the engine for which no λ-1 combustion zone is specified.

In the engine control for internal combustion engines for which a λ=1 charge combustion zone is not specified as shown in FIG. 10, split fuel injection is performed following a sequence routine illustrated by a flow chart shown in FIG. 11 in place of steps S1 through S8 of the flow chart of the fuel injection control sequence routine shown in FIG. 3.

As shown in FIG. 11, after reading in current engine operating conditions at step S101, a judgement is made at step S102 as to whether the engine operating condition is in a stratified charge combustion zone ZW1 and, when affirmative, another judgement is made at step S103 as to acceleration. While the engine operates in the stratified charge combustion zone Z1, it is under ordinary operation, the flow chart logic proceeds to step S19 of the flow chart of the fuel injection control sequence routine shown in FIGS. 4 and 5 to perform the split fuel injection for a λ=1 charge combustion. On the other hand, while the engine operates in the stratified charge combustion zone Z1, it is under acceleration, the flow chart logic proceeds to step S9 of the flow chart of the fuel injection control sequence routine shown in FIGS. 4 and 5 to perform the split fuel injection for a λ=1 charge combustion. When the engine operates out of the stratified charge combustion zone Z1, in other words, operates in an enriched charge combustion zone Z3, the flow chart logic proceeds to step S18 of the flow chart of the fuel injection control sequence routine shown in FIGS. 4 and 5 to perform the suction stage fuel injection only.

Figure 12:
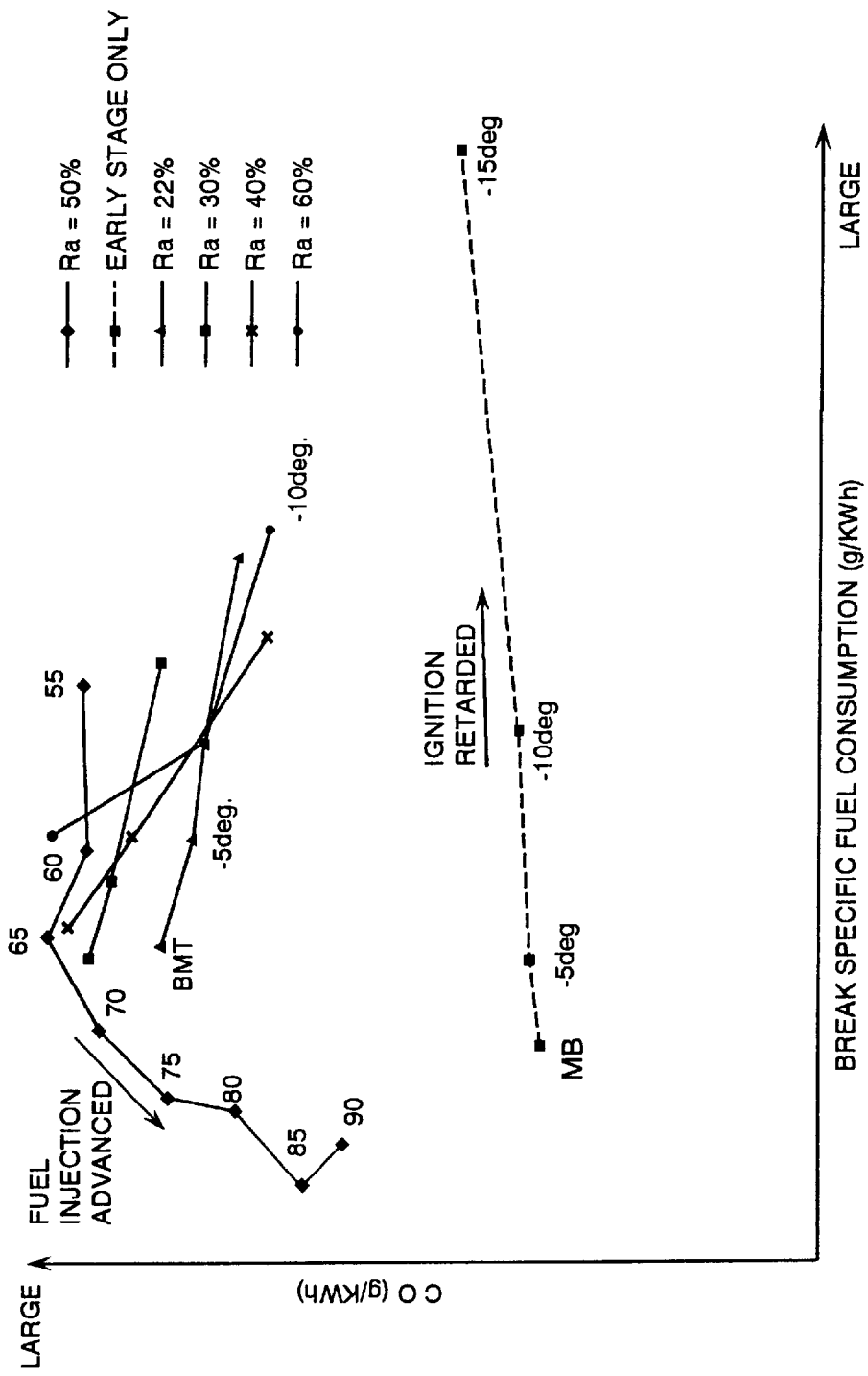
FIG. 12 is a graph showing an effect of split fuel injection on specific fuel consumption and the carbon monoxide content of exhaust gas.

FIG. 12 shows the relationship of specific fuel consumption relative to the carbon monoxide (CO) content of exhaust gas per one horsepower for one hour for the suction stage fuel injection and the split fuel injection with various splitting ratios Ra between 22 and 60%. Fuel ignition was made with various ignition timing retards. Further, both suction stage and split fuel injection were timed at 65° before top dead center, the split fuel injection with a split ratio Ra of 50% was further made with some advances before top dead center of a combustion stroke. Measurement conditions were of an engine speed of 1,500 rpm, a mean effective pressure of 3 kgf/cm$^2$ and an excess air ratio of 1.

As apparently revealed in FIG. 12, although the suction stage fuel injection yields an increase in the carbon monoxide (CO) content of exhaust gas due to retardation of an ignition timing, the split fuel injection yields a noticeable increase in the carbon monoxide (CO) content of exhaust gas which is twice as much as that resulting from the suction stage fuel injection. Further, it is proved that the carbon monoxide (CO) content of exhaust gas is reduced as the fuel injection timing is advanced. There is no aggravation of specific fuel consumption. It can be said on the basis of the result that the split fuel injection enables the NOx absorbing layer 22 of the catalyst 14 to receive a n increased amount of carbon monoxide (CO) emission.

Figure 13:
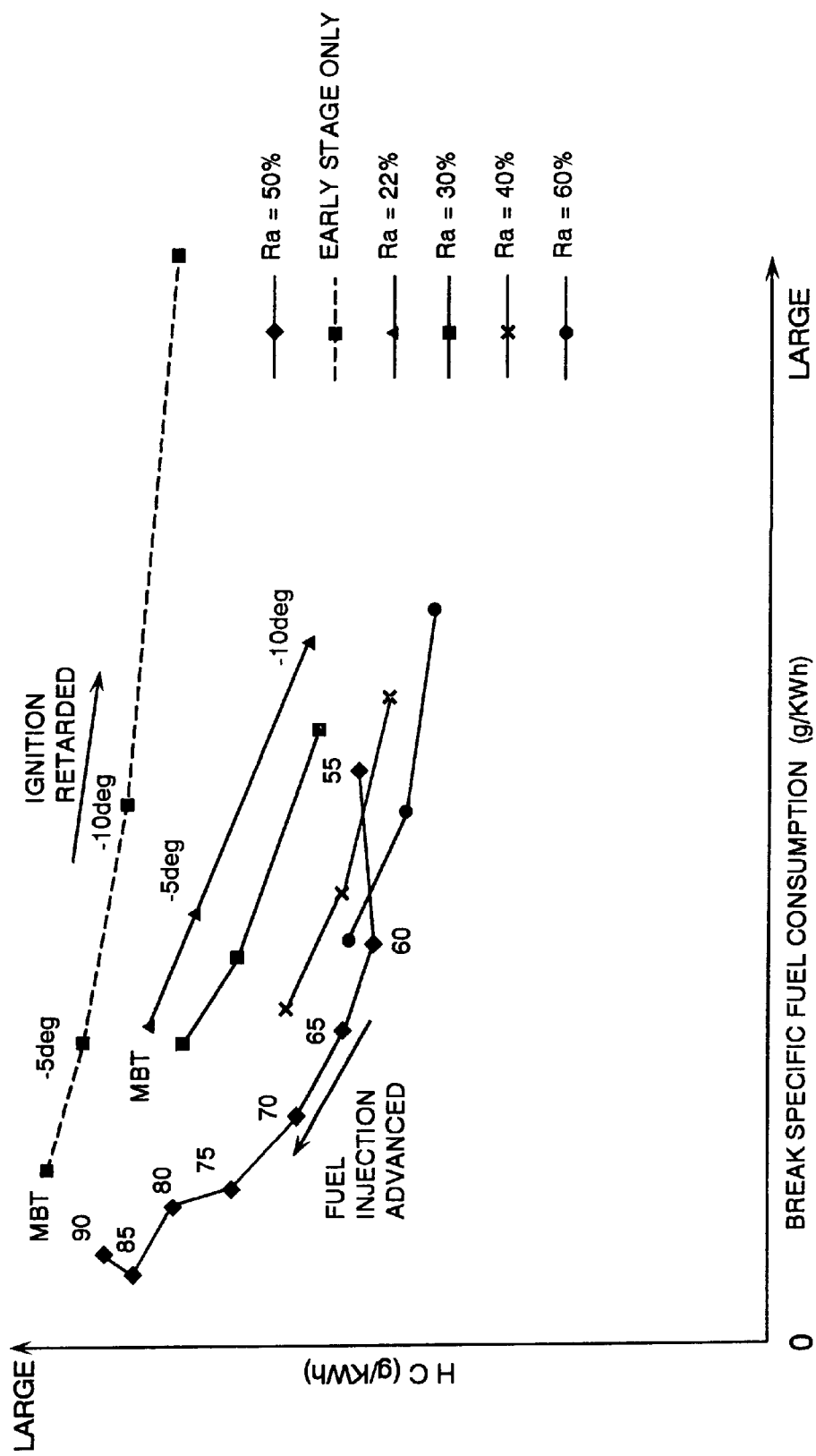
FIG. 13 is a graph showing an effect of split fuel injection on specific fuel consumption and the hydrocarbon content of exhaust gas.

FIG. 13 shows the relationship of the hydrocarbon (HC) content of exhaust gas relative to specific fuel consumption per one horsepower for one hour for the suction stage fuel injection and the split fuel injection measured under the same condition as the carbon monoxide (CO) content of exhaust gas shown in FIG. 12. It is revealed in FIG. 13 that the split fuel injection yields a decrease in the hydrocarbon (HC) content of exhaust gas, that although the hydrocarbon (HC) content of exhaust gas is reduced by the suction stage fuel injection only due to retardation of an ignition timing, it is noticeably reduced by the split fuel injection, and that there occurs an increase in the hydrocarbon (HC) content of exhaust gas due to an advancement of fuel injection timing during the split fuel injection. It can be said on the basis of the result that the split fuel injection reduces the hydrocarbon content of exhaust gas on condition that the hydrocarbon keeps an amount necessary to fulfill a reduction effect for purifying nitrogen oxides (NOx), which is always desirable for exhaust gas purification.

Figure 14:
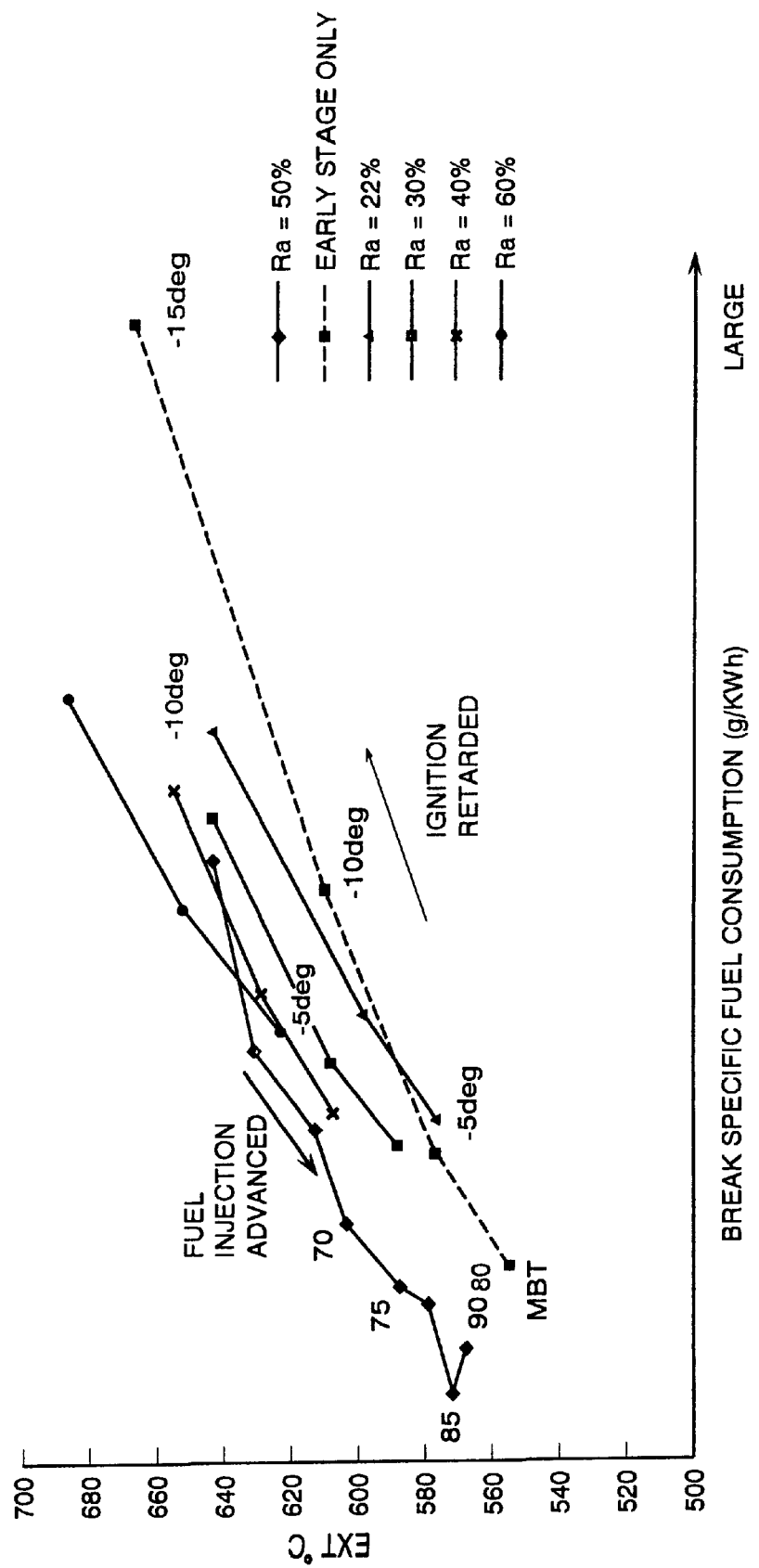
FIG. 14 is a graph showing an effect of split fuel injection on specific fuel consumption and exhaust gas temperature.

FIG. 14 shows the temperature of exhaust gas measured under the same condition as the carbon monoxide (CO) content of exhaust gas shown in FIG. 12. It is revealed in FIG. 14 that while a rise in exhaust gas temperature is caused by simply retarding an ignition timing, it is noticeable when the split fuel injection is performed.

The split fuel injection may be performed during a suction stroke only. This suction stroke split fuel injection is made after a specified duration of the split fuel injection in suction and compression strokes in an accelerating state with middle engine speed and loading or may be performed while the engine 1 operates with lower engine speed and higher engine loading. In this instance, the suction stroke split fuel injection provides an effect of an increase in the carbon monoxide content of exhaust gas as well as the split fuel injection in suction and compression strokes.

Figure 15:
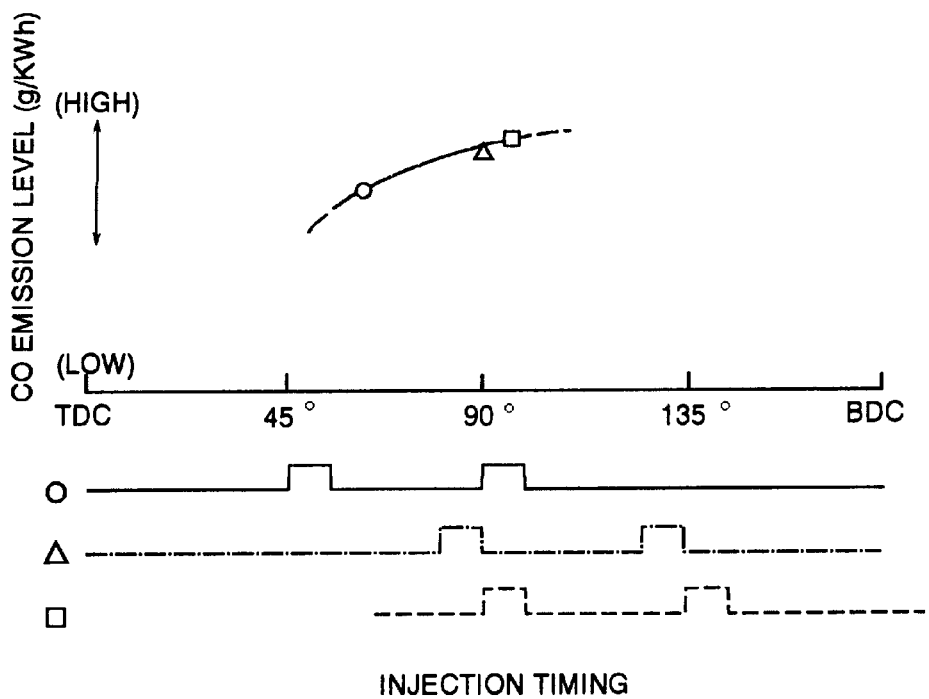
FIG. 15 is a graph showing the relationship between split fuel injection timing in a suction stroke and carbon monoxide emission level.

FIG. 15 shows the carbon monoxide emission level when the split fuel injection is performed in a later stage of a suction stroke. As seen in FIG. 15, it is proved that retarding a fuel injection timing toward the later stage of a suction stoke provides a rise in carbon monoxide emission level.

Figure 16:
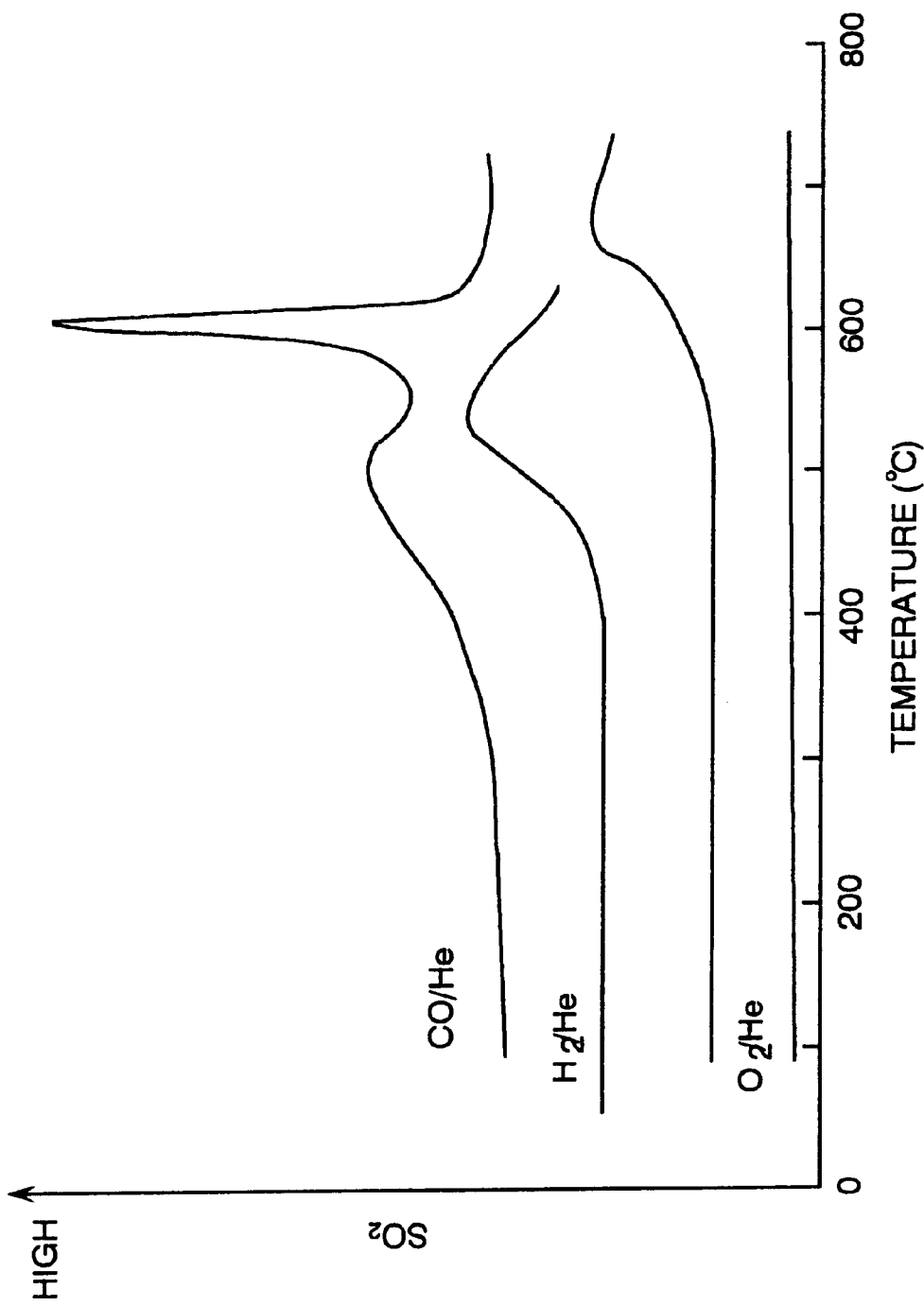
FIG. 16 is a graph showing sulfur oxide ($SO_2$) desorption characteristics of nitrogen oxide absorbing materials heated in different atmospheric conditions.

FIG. 16 shows a sulfur oxide desorption characteristic of the NOx absorbing layer 22 in various atmospheres after poisoned by a large amount of sulfur oxide ($SO_2$). A pure helium gas and a helium gas containing 1% of carbon monoxide (CO), hydrogen ($H_2$) or oxygen ($O_2$) were employed as an atmospheric gas.

As shown in FIG. 16, it is revealed that the NOx absorbing layer 22 is hard to desorb sulfur oxide ($SO_2$) in an oxidizing gas such as oxygen ($O_2$) even at a high temperature, and that the NOx absorbing layer 22 accelerates desorption of sulfur oxide ($SO_2$) in a reducing gas such as carbon monoxide (CO) and hydrogen ($H_2$). It is clear that a gas of carbon monoxide (CO) causes the NOx absorbing layer 22 to desorb over a wide range of gas temperatures. In particular, the NOx absorbing layer 22 yields an enhanced effect of desorbing sulfur oxide ($SO_2$) in the reduction gas with atmospheric gas temperatures starting from a temperature of 400° C. and shows a significant peak of sulfur oxide ($SO_2$) desorption in the reducing gas at a temperature of 600° C. The temperature of exhaust gas discharged from an engine under ordinary operating condition is between 400 and 600° C. The split fuel injection in the warm-up $\lambda=1$ charge combustion zone provides an increase in the carbon monoxide (CO) content of exhaust gas and a slight rise in exhaust gas temperature and, as a result of which, the NOx absorbing material of the catalyst desorbs effectively sulfur oxide ($SO_2$) and is re-activated. This effect is more significant when the catalyst contains ceria or cerium oxide ($CeO_2$).

Figure 17:
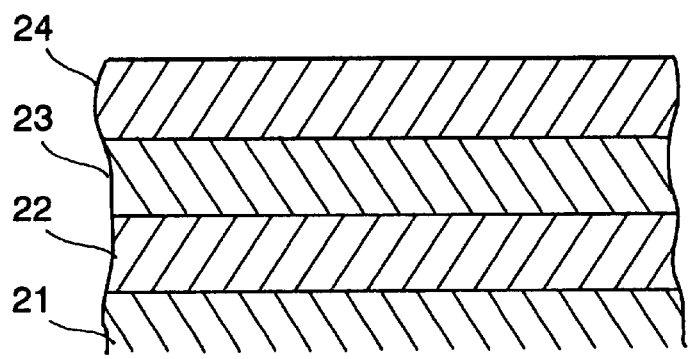
FIG. 17 is a cross-sectional view of a three layer exhaust gas purifying catalyst employed in the exhaust gas purifying system shown in FIG. 1.

For an actual use test of the exhaust gas purifying catalyst used in the exhaust gas purifying system of the invention, two types of exhaust gas purifying catalysts were prepared, namely a two layer catalyst comprised of a nitrogen oxide absorbing material layer 22 and a catalytic material layer 23 coated on a support member 21 as shown in FIG. 2 and a three layer catalyst comprised of a nitrogen oxide absorbing material layer 22, a catalytic material layer 23 and a sera layer coated on a support member 21 in this order as shown in FIG. 17. A cordierite monolith honeycomb bed was used as the support member 21. In both exhaust gas purifying catalysts, the nitrogen oxide absorbing material layer 22 contained platinum (Pt) and barium (Ba) carried by alumina and ceria, and a hydrate alumina binder, and the catalytic material layer 23 contained platinum (Pt) and rhodium (Rh) carried by zeolite and a hydrate alumina binder. The ceria layer of the three layer catalyst contained ceria and a hydrate alumina binder.

For preparation of the two layer catalyst, alumina and ceria, and a hydrate alumina binder was mixed with a weight ratio of 46.5:46.5:7, and then added by water and nitric acid to provide slurry of the mixture. The nitric acid was added to regulate a pH of the mixture slurry between 3.5 and 4. The cordierite monolith honeycomb bed 21 was dipped in the mixture slurry. After removing an excess part of the mixture slurry, the cordierite monolith honeycomb bed 21 was dried at 150° C. for two hours and subsequently burnt at 500° C. for two hours. The process was performed one time such that each of the alumina and ceria was born 78 g per one litter of the cordierite monolith honeycomb bed 21 (which is hereafter expressed as 78 g/L). As a result, the under layer 22 comprising the total amount of alumina and ceria which was 37 weight % of the cordierite monolith honeycomb bed 21 was formed on the cordierite monolith honeycomb bed 21.

Further, a dinitro-diamine platinum solution and a rhodium nitrate solution were mixed such that a ratio of platinum (Pt) and rhodium (Rh) contained in the mixture was 75:1. The mixture was added by powdered zeolite (MFI type) and diluted with water to provide slurry such that the total weight amount of platinum (Pt) and rhodium (Rh) per 1 Kg of zeolite was 24 g. The slurry was dried with a splay-drying device and subsequently burnt at 500° C. for two hours to prepare platinum and rhodium (Pt-Rh) carrying zeolite powder.

The Pt-Rh carrying zeolite powder was mixed with hydrate alumina with a weight ratio of 85:15 and subsequently added to water to provide slurry. The cordierite monolith honeycomb bed 21 with an alumina and ceria layer coated thereon was dipped in the mixture slurry. After removing an excess part of the mixture slurry, the cordierite monolith honeycomb bed 21 was dried at 150° C. for two hours and subsequently burnt at 500° C. for two hours. The process was performed such that each of the total amount of platinum and rhodium was between 20 and 22 g/L (5 weight % of the cordierite monolith honeycomb bed 21). As a result, the over layer 23 comprising platinum and rhodium was formed on the under layer 22 on the cordierite monolith honeycomb bed 21.

Further, the cordierite monolith honeycomb bed 21 was impregnated with a mixture of a dinitro-diamine platinum solution and a barium nitrate solution such that it bears 6.5 g/L platinum and 30 g/L barium. Thereafter, the cordierite monolith honeycomb bed 21 was dried at 150° C. for two hours and subsequently burnt at 500° C. for two hours. In this instance, the solutions containing platinum and barium, respectively, pass through ceria and zeolite without stopping because of small specific surface areas of ceria and zeolite particles and reaches alumina, so that the platinum and barium are carried by the alumina. Through these processes, the two layer catalyst was completed.

For preparing the three layer catalyst, the two layer catalyst before impregnation with a mixture of a dinitro-diamine platinum solution and a barium nitrate solution was dipped in a water slurry containing ceria and hydrate alumina with a weight ratio of 10:1. After removing an excess part of the slurry, the cordierite monolith honeycomb bed 21 was dried at 150° C. for two hours and subsequently burnt at 500° C. for two hours. The process was performed such that the amount of ceria was 100 g/L. As a result, the ceria layer 24 was formed on the over layer 23 on the cordierite monolith honeycomb bed 21. Thereafter, the cordierite monolith honeycomb bed 21 was impregnated with a mixture of a dinitro-diamine platinum solution and a barium nitrate solution to complete the three layer catalyst.

Actual use tests were made by operating a fuel direct injection type of two-line, four cylinder engine having an exhaust line with each of the exhaust gas purifying catalysts installed below a floor of a passenger compartment of a vehicle. The engine was operated with a space velocity of 25000/h in an MC transitional mode for a specified period of time. Further, the engine was operated with use of a fuel containing 150 ppm sulfur for 24 hours such that exhaust gas risen to and kept a temperature of 350° C. so as to poison the catalyst by sulfur (S). Then, under a condition of a space velocity of 25000/h, nitrogen oxide conversion efficiency was measured for 130 seconds after a change in air-fuel ratio to a lean side from a rich side. Further, after flowing exhaust gas, whose air-fuel ratio was 13.5 and which was comprised of 13% of $CO_2$, 0.2% of $O_2$, 2.8% of CO, 0.9% of $H_2$, 0.06% of HC, 0.1% of NO and the balance of $N_2$, through the catalyst at 500° C. for 30 minutes, nitrogen oxide conversion efficiency was measured under the same conditions. Differences between the nitrogen oxide conversion efficiency after poisoning and the nitrogen oxide conversion efficiency after reactivation were obtained. As a result, the two layer catalyst caused a 13% difference of nitrogen oxide conversion efficiency, and the three layer catalyst caused a 33% difference of nitrogen oxide conversion efficiency, This result reveals that supply of carbon monoxide reactivates the nitrogen oxide absorbing material poisoned by sulfur, and the ceria layer affect on reactivation of the poisoned nitrogen oxide absorbing material.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An exhaust gas purifying system having a nitrogen oxide absorbing material disposed in an exhaust line of an internal combustion engine for absorbing nitrogen oxides in exhaust gases containing other emissions that are sulfuric components poisoning the nitrogen oxide absorbing material when a fuel mixture is leaner than a fuel mixture of an excess air factor of 1 (one) to reduce the nitrogen oxides thereby purifying the exhaust gas said exhaust gas purifying system comprising:

engine operating condition detecting means for detecting a specific engine operating condition in which said nitrogen oxide absorbing material absorbs said other emissions; and carbon monoxide supply means for supplying carbon monoxide to said nitrogen oxide absorbing material so that said nitrogen oxide absorbing material absorbs said carbon monoxide and desorbs said other emissions while said specific engine operating condition is detected:

wherein said carbon monoxide supply means produces a rich fuel mixture with an air-fuel ratio represented by an excess air factor equivalent to 1 (one) or higher locally in a combustion chamber of the engine and a lean fuel mixture with an air-fuel ratio represented by an excess air factor lower than 1 (one) in the combustion chamber around said rich fuel mixture and burns said rich and lean fuel mixtures thereby providing an increase in an amount of carbon monoxide in the exhaust gas.

2. The exhaust gas purifying system as defined in claim 1, wherein said carbon monoxide supply means produces a rich fuel mixture with an air-fuel ratio represented by an excess air factor of 1 (one) or higher near a spark plug in a combustion chamber of the engine and a lean fuel mixture with an air-fuel ratio represented by an excess air factor lower than 1 (one) in the combustion chamber around said rich fuel mixture and burns said rich and lean fuel mixtures so as thereby to provide an increase in an amount of carbon monoxide in the exhaust gas.

3. The exhaust gas purifying system as defined in claim 1, wherein said carbon monoxide supply means performs divides an amount of fuel to be injected for one combustion cycle for each cylinder into a plurality of parts and injects said fuel directly into the combustion chamber during suction and compression strokes so as thereby to provide an increase in an amount of carbon monoxide in the exhaust gas.

4. The exhaust gas purifying system as defined in claim 3, wherein said carbon monoxide supply means performs divides an amount of fuel to be injected for one combustion cycle for each cylinder into a plurality of parts and injects said fuel directly into the combustion chamber at least one time during each of suction and compression strokes so as thereby to provide an increase in an amount of carbon monoxide in the exhaust gas.

5. The exhaust gas purifying system as defined in claim 3, wherein said carbon monoxide supply means performs divides an amount of fuel to be injected for one combustion cycle for each cylinder into a plurality of parts and injects said fuel directly into the combustion chamber during a suction stroke only so as thereby to provide an increase in an amount of carbon monoxide in the exhaust gas.

6. The exhaust gas purifying system as defined in claim 3, wherein said carbon monoxide supply means performs divides an amount of fuel to be injected for one combustion cycle for each cylinder into a plurality of parts and injects said fuel directly into the combustion chamber so as thereby to deliver an air-fuel ratio of a whole fuel mixture in the combustion chamber represented by an excess air factor of 1 (one).

7. The exhaust gas purifying system as defined in claim 1, wherein said nitrogen oxide absorbing material is comprised of at least one of alkaline earth metals, alkaline metals and rear-earth metals.

8. The exhaust gas purifying system as defined in claim 7, wherein said nitrogen oxide absorbing material is coated as a nitrogen oxide absorbing layer on a support member installed in the exhaust line.

9. The exhaust gas purifying system as defined in claim 8, and further comprising zeolite disposed on said support member so as to come into contact with the exhaust gas prior to said nitrogen oxide absorbing material.

10. The exhaust gas purifying system as defined in claim 8, and further comprising ceria disposed on said support member so as to come into contact with the exhaust gas prior to said nitrogen oxide absorbing material.

11. The exhaust gas purifying system as defined in claim 8, wherein said nitrogen oxide absorbing layer contains at least one of noble metals.

12. The exhaust gas purifying system as defined in claim 11, and further comprising a catalyst layer coated over said nitrogen oxide absorbing layer, wherein said nitrogen oxide absorbing layer contains barium and platinum and said catalyst layer contains zeolite and at least one of noble metals.

13. The exhaust gas purifying system as defined in claim 1, wherein said other emissions include sulfur oxides.

14. An exhaust gas purifying system having a nitrogen oxide absorbing material comprised of at least one of alkaline earth metals, alkaline metals and rear-earth metals which is disposed in an exhaust line of an internal combustion engine to reduce and purify nitrogen oxides in exhaust gases containing other emissions, said exhaust gas purifying system comprising:

engine operating condition detecting means for detecting a specific engine operating condition in which said nitrogen oxide absorbing material absorbs said other emission; and carbon monoxide supply means for producing a rich fuel mixture with an air-fuel ratio represented by an excess air factor of 1 (one) or higher locally in a combustion chamber of the engine and a lean fuel mixture with an air-fuel ratio represented by an excess air factor lower than 1 (one) in the combustion chamber around said rich fuel mixture and burns said rich and lean fuel mixtures so as thereby to provide an increase in an amount of carbon monoxide in the exhaust gas.

15. An exhaust gas purifying system having a nitrogen oxide absorbing material operative to absorb carbon oxides, sulfur oxides and nitrogen oxides absorbable in this order to reduce and purify nitrogen oxides in exhaust gases containing other emissions, said exhaust gas purifying system comprising:

engine operating condition detecting means for detecting a specific engine operating condition in which said nitrogen oxide absorbing material absorbs said other emission; and carbon monoxide supply means for producing a rich fuel mixture with an air-fuel ratio represented by an excess air factor of 1 (one) or higher locally in a combustion chamber of the engine and a lean fuel mixture with an air-fuel ratio represented by an excess air factor lower than 1 (one) around said rich fuel mixture in the combustion chamber and burning said rich and lean fuel mixtures so as thereby to provide an increase in an amount of carbon monoxide in the exhaust gas.

16. An exhaust gas purifying system for purifying exhaust gas containing emissions including nitrogen oxides from an internal combustion engine, which comprises:

an engine operating condition sensor for detecting a specific engine operating condition in which said nitrogen oxide absorbing material absorbs said other emission;

a fuel injector for supplying fuel to a combustion chamber of the engine;

a nitrogen oxide absorbing material disposed in an exhaust line of the engine for absorbing nitrogen oxides in exhaust gases from the engine while an air-fuel ratio represented by an excess air factor is higher than 1 (one) and desorbing said nitrogen oxides therefrom while an air-fuel ratio represented by an excess air factor is equal to or lower than 1 (one); and a control unit for changing a target air-fuel ratio between an excess air factor equal to or less than 1 (one) and an excess air factor higher than 1 (one) according to engine operating conditions and controlling an amount of fuel injection to deliver said target air-fuel ratio, providing said fuel injector with a control signal of a value relating at least to an amount of fuel delivered through said fuel injector, and providing said fuel injector with a signal relating to at least one of an amount of fuel injection and an fuel injection timing so as to produce a rich fuel mixture with an air-fuel ratio represented by an excess air factor equivalent to 1 (one) or higher locally in a combustion chamber of the engine and a lean fuel mixture with an air-fuel ratio represented by an excess air factor lower than 1 (one) around said rich fuel mixture in the combustion chamber and to burn said rich and lean fuel mixtures while said engine operating condition sensor detects said specific engine operating condition.

* * * * *